United States Patent [19]

Pertle

[11] 4,422,356

[45] Dec. 27, 1983

[54] CUTTING TOOL BIT HOLDER

[75] Inventor: John E. Pertle, Garden Valley, Calif.

[73] Assignee: Tri Tool Inc., Rancho Cordova, Calif.

[21] Appl. No.: 388,709

[22] Filed: Jun. 15, 1982

[51] Int. Cl.³ .......................................... B23B 29/04
[52] U.S. Cl. ..................................... 82/36 R; 82/4 C
[58] Field of Search ............... 82/36 R, 36.4, 37, 4 C, 82/4 R, 4 A; 144/205

[56] References Cited

U.S. PATENT DOCUMENTS

| | | | |
|---|---|---|---|
| 2,188,917 | 2/1940 | Poorman | 82/36 R |
| 2,326,467 | 8/1943 | Kuehn | 82/34 R |
| 3,103,140 | 9/1963 | Connelly | 82/4 R |
| 3,129,620 | 4/1964 | Muelhauser | 144/205 |
| 4,149,436 | 4/1979 | Blattler | 82/4 C |
| 4,343,207 | 8/1982 | Paysinger | 82/4 R |

FOREIGN PATENT DOCUMENTS 1020524 2/1953 France .................................. 82/37

*Primary Examiner*—Leonidas Vlachos
*Attorney, Agent, or Firm*—Bacon & Thomas

[57] ABSTRACT

A cutting tool bit holder for a machine tool removably secures a bit having a dovetail base in cutting position on a rotary tool fixture by means of a removable clamp bar and an opposed gib surface. The clamp bar is secured by removable fasteners and the tool bit may be reversable and standardized.

10 Claims, 4 Drawing Figures

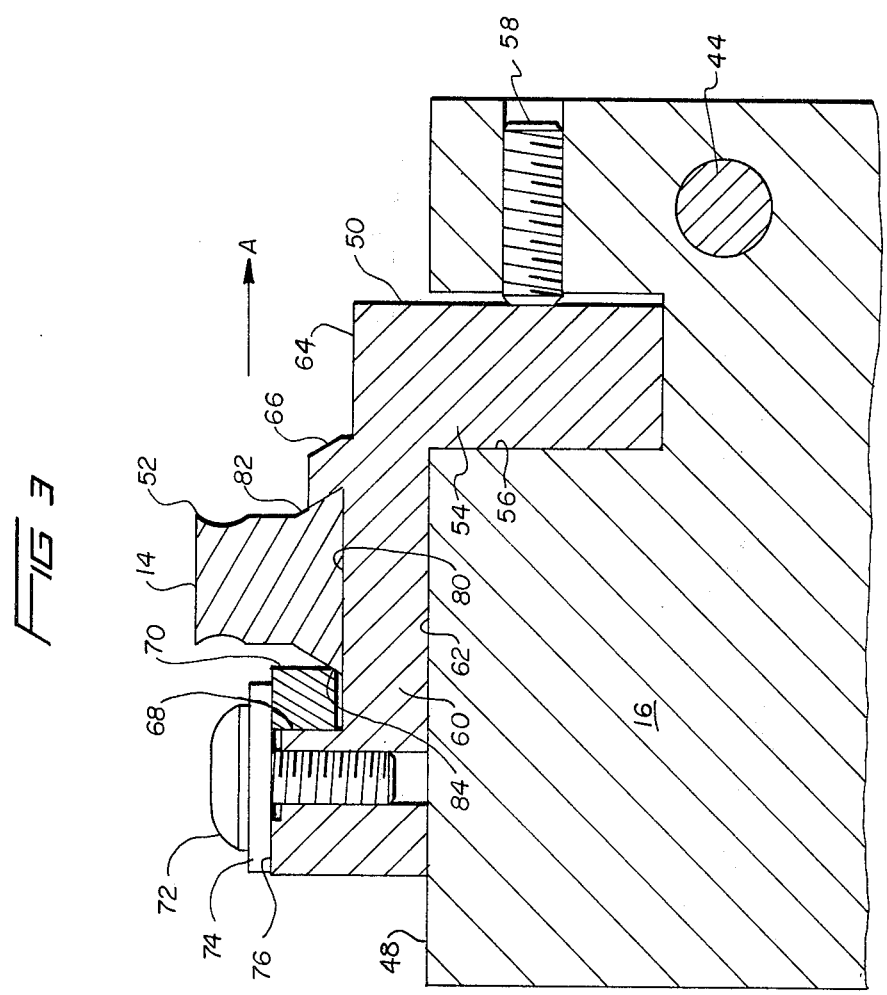

CUTTING TOOL BIT HOLDER

BACKGROUND OF THE INVENTION

1. Field of the Invention

This invention relates to the machine tool art, and in particular to cutting tool bit holders for machine tools.

2. Description of the Prior Art

The present invention is concerned with cutting tool bit holders for machine tools and particularly pipe end preparation tools used to machine pipe ends to obtain specified configurations and dimensions of such pipe ends in preparation for welding operations.

A representative example of a tool of this kind is disclosed in U.S. Pat. No. 3,051,059 granted in 1962 to G. F. Davey. The tool shown in this patent provides a particularly good illustration of how prior art tooling concerned with pipe end milling and turning typically utilized rather massive and specially formed cutter bits which, according to usual practice, were ground and sharpened to be operational in a single carefully set position on the tool bit carrier which carried the bits in a circular cutting orbit about the tool axis.

The bits made in accordance with prior art techniques usually tend to be specialized, expensive, and rather massive when large workpieces are involved. Moreover, it is generally not considered to be economical to dispose of the bits when they become dulled from continued usage so they are usually resharpened or reworked by skilled toolmakers and returned to service by skilled operators who must again locate the bits in their precise cutting position on the machine tool head in preparation for continued operations.

The tool bits according to the prior usually are not reversible because of various technical considerations that are well-known to tool makers, including the fact that the various rake and cant angles ground into the tools are usually unique for each cutting direction and tool bit orientation.

It has been recognized by the inventor of the present invention that it would be highly desirable to provide a tool bit holder for a pipe end preparation tool that would enable the use of a less costly and simpler standardized tool bit that could be reversibly used, replaced by non-skilled labor, sufficiently inexpensive to be disposable after a relatively short service life, and which could support the tool bit in various positions on the tool head without elaborate set-up time or critical locating requirements. Such a holder, in addition, would be able to support the cutter tool bit in a variety of positions relative to the tool head and possess sufficient rigidity and strength so as to prevent vibration and chatter of the tool during cutting operations.

The present invention is intended and has for its objective the achievement of the above-mentioned characteristics for a tool holder.

BRIEF SUMMARY OF THE INVENTION

This invention is a cutting tool holder for removably holding a cutting tool bit on a machine tool support fixture that is arranged to receive the holder in an axially extending opening of the fixture and to carry the holder about a circular orbital path for performing a surface cutting operation on a workpiece, for example a pipe or tube end.

The holder is arranged to provide a surface upon which a tool bit can be accurately and rigidly located, yet readily removable and replaceable with a similar tool bit for continued machining operations. The tool bit is held in place by a removable clamp bar that secures the tool bit to the forward facing surface of the holder in cooperation with a female gib surface provided on the same holder surface.

The holder is L-shaped so that the first depending leg of the holder can be secured in an axially facing opening in the rotary machine tool fixture that carries the tool bit in a circular orbit. A laterally extending second leg of the holder presents the tool bit to the workpiece on the forward or distal surface thereof. The second leg of the holder extends laterally from the first leg in a direction away from the cutting direction of the tool bit. A female dovetail gib is provided on the distal surface of the second leg of the base and a clamp bar having a sloping lower surface is engageable with a dovetail surface on the tool bit to clamp the bit to the surface of the holder.

The clamp bar is secured by removable fasteners to urge the bar towards the holder base which, because of the interaction between the sloping surface on the clamp bar and the dovetail surface on the tool bit, results in the tool bit being cammed into the female dovetail gib when the clamp bar is urged towards the distal surface of the holder.

The first leg of the holder can be straight or angled to accommodate various cutting requirements and the tool bit preferably is standardized in shape and form so as to be readily replaceable on the holder. Preferably, the tool bit is provided with a pair of sharpened cutting edges that can be reversibly used.

BRIEF DESCRIPTION OF THE DRAWINGS

With reference to the drawings, the views are as follows:

FIG. 3 is a detail end view of the tool bit holder taken aong line III—III of FIG. 2.

DETAILED DESCRIPTION OF PREFERRED EMBODIMENT OF INVENTION

Figure 1:
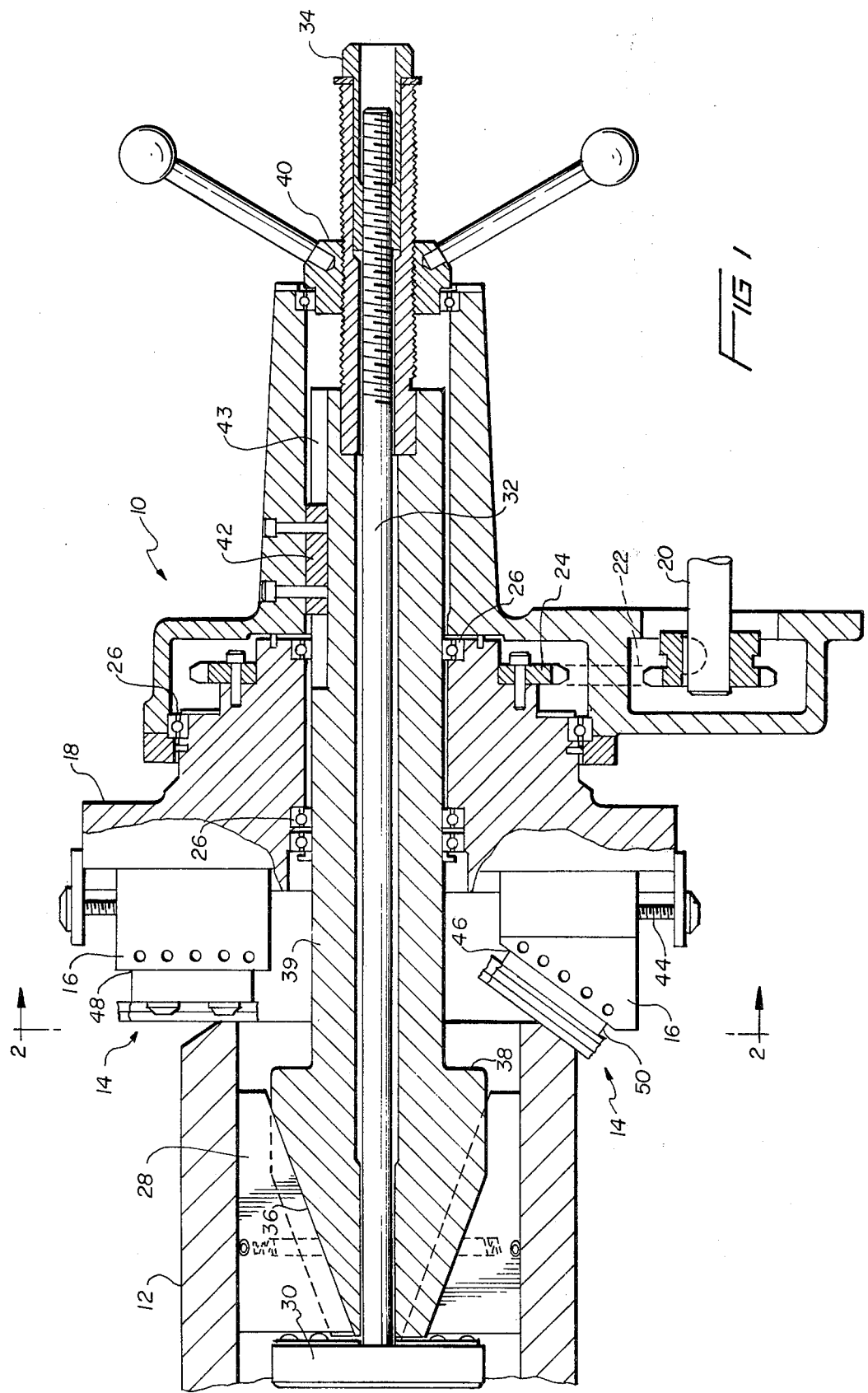
FIG. 1 is a side elevational sectional view of a machine tool such as a pipe end preparation tool incorporating a cutting tool bit holder constructed in accordance with the present invention.

Referring to the drawings, FIG. 1 shows a typical application of the cutting tool bit holder embodying the present invention, namely a pipe or tube end machine tool 10 adapted to machine the end surface or surface areas of a pipe or tube 12 by cutter tool bits 14 that are carried by support fixtures 16 in circular orbital paths about the rotational axis of the tool 10.

The tool support fixtures 16 are carried by a rotary tool head 18 driven by input shaft 20 through a chain drive 22 and sprockets 24. Suitable bearings 26 are illustrated to show how the tool head is supported relative to the tool housing for rotation. The tool illustrated here is exemplary only, and the invention is readily adapted for use with any rotary tool head driven by suitable motion producing means, including a manual rotation system.

A mandrel assembly for supporting the pipe 12 and tool 10 fixed relative to each other includes mandrel blades 28 that are radially driven into expanded condition to engage the interior of the pipe by end plate 30 that is axially driven by mandrel actuator rod 32 and mandrel actuator nut 34 to cause blades 28 to ride up cam surfaces 36 of the head 38 of a main mandrel shaft 39.

The tool 10 is advanced towards or away from the pipe 12 (or vice versa, depending which is held fixed) by rotation of feed nut 40 (which may be manually or mechanically rotated) which causes the tool housing to move axially relative to the mandrel shaft 39 to control the relative spacing between the tool 10 and pipe 12 when the tool and pipe are assembled as illustrated. The tool housing, of course, is prevented from rotating relative to the mandrel shaft 39 by a key and keyway arrangement 42, 43.

The tool support fixtures 16 may be radially adjustable by lead screws 44 and may have inclined or radial end faces 46, 48 respectively, depending on the type of cut to be made on the end of the pipe 12. The inclined fixture 46, for example, would typically be used to machine a bevel on the end of the pipe, while the straight radial fixture 48 would be used for a facing operation in a typical set up. However, as will be described below, the present invention can be used with inclined or straight support fixtures to machine either bevels or straight facing cuts with either fixture.

Figure 2:
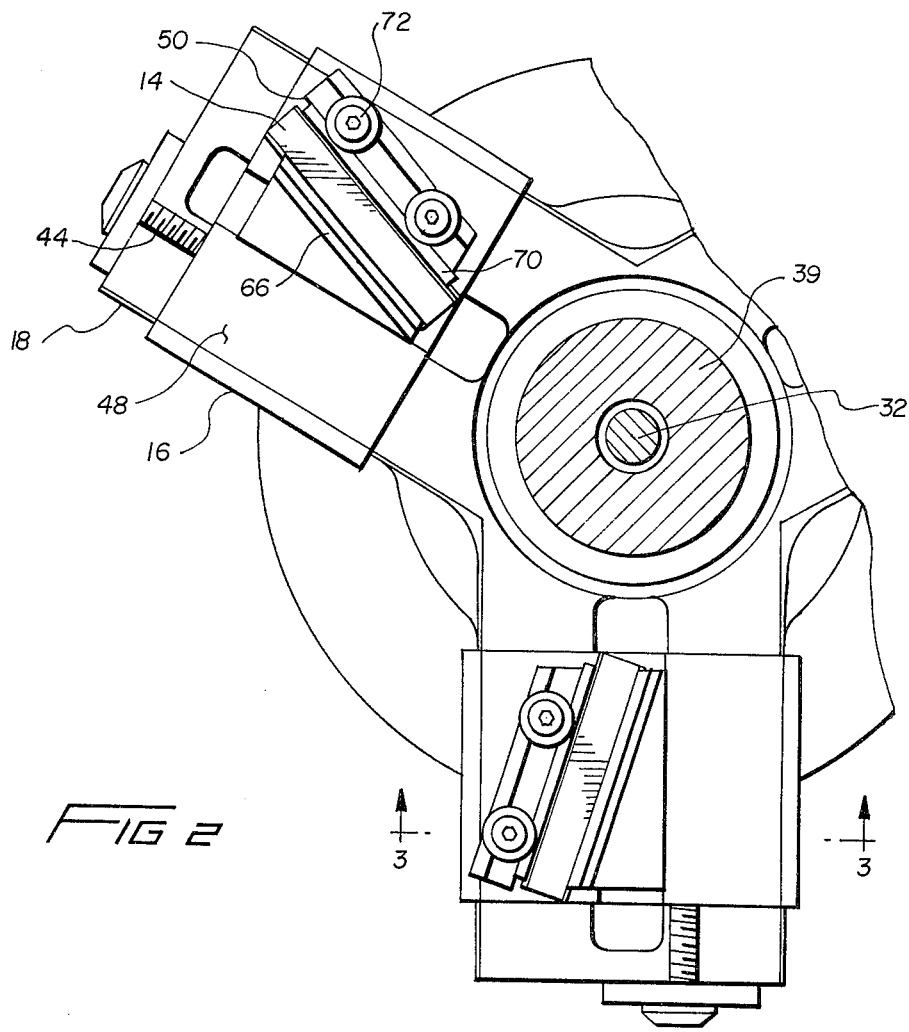
FIG. 2 is a partial cutaway end view taken along line II—II of FIG. 1.

As best viewed in FIGS. 2 and 3, the cutting tool bits 14 are seen to be smaller than typical tool bits used in machine tools of the type illustrated in U.S. Pat. No. 3,051,059 mentioned previously. This is intentional, because it is an object of the present invention to enable the use of disposable or less costly tool bits in such tooling to avoid the compelling need to resharpen and maintain the more costly tool bits conventionally used with this type of tooling. Moreover, the arrangement and design of the tool bits 14 permit them to carry two identical cutting edges that are reversible to permit the bits to be used over a double operational life span.

Of course, it must be appreciated that operating loads on the tool bit are quite substantial, particularly at higher cutting speeds and when high strength, hard pipe materials are being machined. This requires that the tool bits be firmly and precisely anchored to their support without any freedom of motion after they are locked into place and that no opportunity is provided for the tools to become loose because of wear and tear on the holder. All operating loads imposed on the bits must be reacted in a manner to avoid the occurrence of deformation and vibrations during cutting which would cause the tool to display poor cutting characteristics, including resultant poor finish quality of machined surfaces.

The tool bit holder 50 according to the present invention is intended to rigidly retain and support a cutter bit 14 adjacent an end face 48 of a tool support fixture 16 whereby a cutting edge 52 on the tool bit is presented to the workpiece, for example a pipe end, when the fixture and tool bit are driven about a rotational axis that carries the tool bit in a circular orbit about such axis.

The holder 50 (as shown in FIG. 3, for example) comprises an L-shaped base block having an axially extending first leg 54 arranged to project into an axially extending opening 56 in fixture 16 and to be secured therein in a conventional manner, for example, by means of set screws 58. A second leg 60 extends perpendicular to the first leg in a direction away from the cutting direction (shown by arrow A in FIG. 3) and includes opposed proximal and distal surfaces 62, 64 respectively. The proximal surface 62 is contiguous with the end face 48 of fixture 16 in this embodiment, and is rigidly supported by the fixture along a planar surface as illustrated.

The distal face 64 includes a raised female gib 66 (one-half of a dovetail joint) and an upright stop surface 68 spaced away from and parallel to the female gib 66, which generally extends the length of the base block 50 in a direction inclined away from the cutting direction between the radially inner and outer ends of the block 50, as shown in FIG. 2.

A clamp bar 70 is removably secured to the block 50 so that its rear surface is contiguous with the stop surface by means of threaded fastener 72 and washer 74 located adjacent the stop surface 68 and spaced away from the clamp bar 70, as shown. The fastener 72 is received in a threaded aperture extending generally perpendicular to the distal surface 64 and a raised rib 76 enables the fastener to exert leverage against washer 74 to engage the clamp bar 70 towards the distal surface 64 when the fastener 72 is advanced in its threaded aperture. Of course, any desired number of fasteners and associated washers can be utilized, only two being shown for clarity and because two fasteners usually are adequate in the preferred embodiment. Moreover, while the use of the washers for engaging the clamp bar is preferred, an enlarged head of the fastener itself could be used to secure the clamp bar in place. The use of the washer reduces the frictional loading between the fastener and the clamp bar and moreover enables the use of leverage between the raised rib and the threaded fastener to secure the bar in place. The chance of the bar becoming loose due to frictional wear between the threaded fastener and the clamp bar likewise is reduced by using the washer.

The bar 70, as seen in FIG. 3, does not actually contact the underlying surface 64, for reasons that will become clear momentarily.

The space between the clamp bar 70 and gib 66 actually defines a tool bit receiving slot 80 for receiving the cutting tool bit 14. The bit 14 is provided with the above-mentioned cutting edge and preferably has a duplicate edge on its opposite side adjacent the top surface thereof, whereby the tool can be reversibly used. Preferably, the tool bit 14 is a standardized bit that can be replaced on the tool holder by non-skilled labor, since the holder will precisely define the location of the tool bit. Clearly, the holder itself can be shaped to provide a suitable clearance angle for the tool bit, if desired, so the bits can remain interchangeable.

The tool bit 14 includes dovetail surfaces or gibs 82 adjacent its bottom surface, which rests firmly against the distal surface 64 of block 50. One of the male gibs 82 (the one on the cutting direction side of the bit) engages the female gib 66 and the other (on the trailing side of the bit) is engaged by the clamp bar 70, which includes a cam bevel surface 84 defining a female gib surface cooperating with the other gib on the bit 14.

Accordingly, in operation, bit 14 is placed in slot 80 and is clamped in place by the bar 70 when fasteners 72 are secured in place, with the male gibs of the tool bit respectively engaging the female gib 66 and the cam surface 84 of clamp bar 70. The bar 70 actually cams the bit 14 towards the gib 66 and the surface 64 when urged into engagement with the bit by the fasteners and washers 72, 74.

The base block 50 with the bit attached is then simply clamped up in the fixture 16 by set screws 58 engaging leg 54, and the tool is ready for operation. It will be evident that the tool bit 14 illustrated performs a cutting operation by a shaving action, although the rake angle of the bit can be varied to suit the particular cutting requirements of any machining operation, in a manner well-known to persons skilled in the art of machine tools.

It will also be evident that the cutting loads on the tool bit are reacted by rigid, solid surfaces. The tendency of the tool bit to tilt rearwardly is prevented by the female gib 66, for example, which preferably is integrally formed from the same, tough steel as the block 50, while the block 50 itself is rigidly constructed to prevent displacement of the tool bit during the cutting operation. The clamp bar 70 only has to urge the tool bit 70 towards the gib 66 and downwardly in cooperation with the overturning loads imposed on the bit during a cutting operation, so that the tool bit securing system is quite rigid and effective.

It will thus become apparent that the use of the holder block 50 enables the utilization of a smaller, less costly and standardized tool bit than what has been typically used in the prior art; the tool bit can be designed for reversible operation for longer tool life; the less costly bit can be readily and inexpensively replaced and a new cutter bit set up by nonskilled labor, since the tool bit location is completely pre-set on the tool holder block, which block can be readily designed for various cutting applications.

Figure 4:
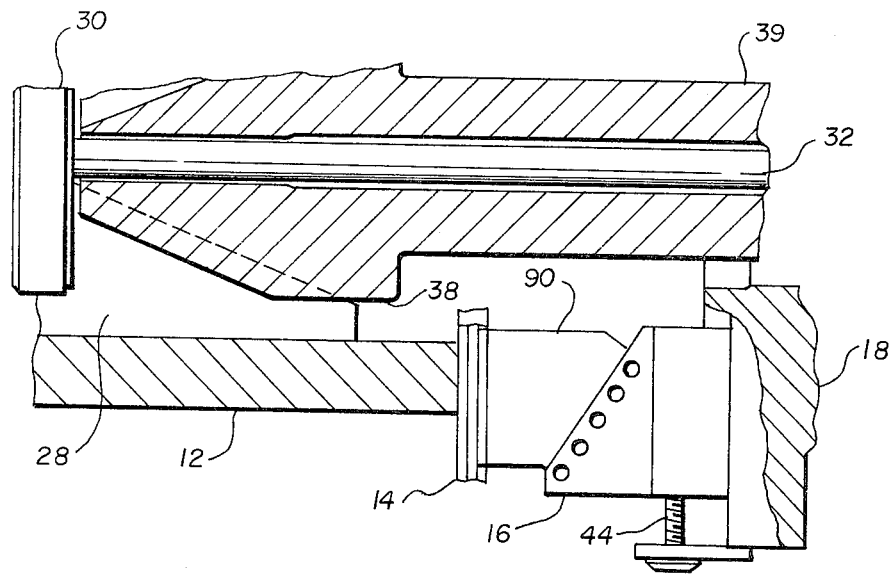
FIG. 4 is a side elevation view of an alternate embodiment of the tool bit holder.

The holder block 50 can be designed with varying angles and surfaces to meet various cutting requirements. For example, as shown in an alternative embodiment in FIG. 4, a block holder 90 includes a first leg that has a portion that is angled with respect to the axis of circular motion, whereby a facing cutter bit can be supported on an angled fixture 16, increasing the versatility of a tool 10 designed originally for bevelling operations.

The holder blade 50, of course, also can be designed to properly position a reversible cutter bit so that cutter clearance is automatically provided in either cutter position to prevent overfeeding and cutter scuffing behind the cutting edge.

Other modifications of the preferred embodiment can be readily envisioned or constructed by those skilled in the relevant art without departing from the scope of the present invention, which is intended to be limited only by the claims set forth below.

What is claimed is:

1. A cutting tool holder for removably holding a cutting tool bit on a machine tool support fixture arranged to receive the holder in an axially extending opening of the fixture and to carry same about a circular orbital path for performing a surface cutting operation on a workpiece, comprising:

a generally L-shaped holder base including a proximal first leg shaped to enable it to be mounted within a corresponding, axially extending opening of a machine tool support fixture and a second leg extending perpendicular to the first leg and in a direction extending away from the cutting direction of the tool bit, said second leg including a distal surface disposed on the side thereof opposite the side from which the first leg extends;

a female dovetail gib, and a stop surface extending parallel to and spaced away from female gib disposed on said distal surface, the gib and stop surface extending upwardly from the distal surface;

a clamp bar having a pair of opposed generally parallel surfaces, the clamp bar disposed with one of said surfaces contiguous with said stop surface and with the opposite surface facing towards but spaced apart from the bit to define a tool bit receiving slot along the distal surface between the bit and said opposite surface;

said clamp bar including a lower surface adjacent said distal surface, said opposite surface including a cam surface sloped towards said bottom surface and said gib surface contiguous with said stop surface, whereby said cam surface and female gib form a pair of female gibs for receiving a pair of male gibs presented on a tool bit locatable in said tool bit receiving slot;

removable fastener means retaining said clamp bar adjacent said stop surface and urging same towards said distal surface.

2. A cutting tool holder as claimed in claim 1, wherein said female gib and clamp bar are inclined towards the cutting direction with the end of the tool bit receiving slot that is located nearest the axis of circular motion leading the opposite end in a cutting direction.

3. A cutting tool holder as claimed in claim 2, said female gib being disposed towards the cutting direction side of said tool bit receiving slot.

4. A cutting tool holder as claimed in claim 1, 2 or 3, including a cutting tool bit disposed within said tool bit receiving slot and comprising an elongated bar having opposed side, and top and bottom surfaces, the opposed side surfaces including male gibs adjacent the bottom surface in engagement, respectively, with said female gib and said camming surface, said bottom surface contiguous with said distal surface, and at least one cutting edge at a side edge of said top surface in the side thereof facing the cutting direction.

5. A cutting tool holder as claimed in claim 4, including a second cutting edge on the opposite side edge of said top surface on the side thereof facing away from the cutting direction, said second cutting edge being a duplicate of the first said cutting edge, whereby the tool bit is reversible in the tool receiving slot.

6. A cutting tool holder as claimed in claim 1, 2 or 3, wherein said first leg lies generally within a single plane and a portion thereof is angled with respect to the axis of circular orbital motion.

7. A cutting tool holder as claimed in claim 5, including a machine tool support fixture having an axial end face and an axially extending opening in said end face, said holder base including a proximal surface located opposite said distal surface and contiguous with said axial end face, said first leg disposed and removably secured within said opening.

8. A cutting tool holder as claimed in claim 7, said end face and proximal surface being planar.

9. A cutting tool holder as claimed in claim 1, 2 or 3, said removable fastener means comprising at least one threaded fastener and means for coupling the fastener to the clamp bar, a threaded aperture in said holder base for receiving said fastener, the aperture located adjacent the stop surface outside the tool receiving slot, and extending in a direction generally parallel to the stop surface, the fastener arranged in the aperture to drive the clamp bar towards said distal surface when it is advanced in the aperture.

10. A cutting tool holder as claimed in claim 9, said fastener comprising a screw or bolt having an enlarged head, and coupling means comprising a washer element beneath the screw or bolt head; a raised rib extending above the distal surface and the stop surface, said rib extending parallel to the stop surface along the opposite side of the fastener so the fastener is between the rib and the stop surface; said clamp bar having a top surface; said washer element engaging said top surface when said fastener is disposed in the threaded aperture with the washer spanning the rib and the clamp bar, whereby advancement of the fastener in the threaded aperture causes the side of the washer engaging the clamp bar to drive the clamp bar towards the distal surface of the holder base while the other side of the washer is held fixed against advancement by the rib.

* * * * *